(12) United States Patent
Rajagopal et al.

(10) Patent No.: US 8,774,142 B2
(45) Date of Patent: Jul. 8, 2014

(54) FLEXIBLE AND INTEGRATED FRAME STRUCTURE DESIGN FOR SUPPORTING MULTIPLE TOPOLOGIES WITH VISIBLE LIGHT COMMUNICATION

(75) Inventors: Sridhar Rajagopal, Plano, TX (US); Doyoung Kim, Seoul (KR); Ying Li, Garland, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 846 days.

(21) Appl. No.: 12/875,518

(22) Filed: Sep. 3, 2010

(65) Prior Publication Data

US 2011/0064405 A1 Mar. 17, 2011

Related U.S. Application Data (60) Provisional application No. 61/276,729, filed on Sep. 16, 2009.

(51) Int. Cl.
*H04W 4/00* (2009.01)
*H04B 7/00* (2006.01)
*H04J 3/26* (2006.01)
*H04L 12/413* (2006.01)
*H04L 12/403* (2006.01)

(52) U.S. Cl.
USPC ........... 370/338; 370/277; 370/432; 370/446; 370/456

(58) Field of Classification Search
USPC ........................................................ 370/338
See application file for complete search history.

(56) References Cited

U.S. PATENT DOCUMENTS

| | | | |
|---|---|---|---|
| 7,545,811 B2* | 6/2009 | Taha | 370/392 |
| 2006/0034233 A1 | 2/2006 | Strutt et al. | |
| 2006/0268908 A1* | 11/2006 | Wang et al. | 370/401 |
| 2008/0192812 A1* | 8/2008 | Naeve et al. | 375/222 |
| 2009/0022496 A1 | 1/2009 | Shin et al. | |
| 2009/0073952 A1* | 3/2009 | Shin et al. | 370/345 |
| 2009/0227282 A1* | 9/2009 | Miyabayashi et al. | 455/552.1 |
| 2011/0069962 A1* | 3/2011 | Castor et al. | 398/115 |
| 2012/0193517 A1* | 8/2012 | Zickler et al. | 250/208.2 |
| 2014/0010556 A1* | 1/2014 | Yoshima | 398/212 |

OTHER PUBLICATIONS

IEEE 802.15-09-0549.*
IEEE 802.15-09-0564.*
International Search Report dated Mar. 28, 2011 in connection with International Patent Application No. PCT/KR2010/006363.

\* cited by examiner

*Primary Examiner* — Jae Y Lee
*Assistant Examiner* — Abu-Sayeed Haque (57) ABSTRACT

For use in a visible light communication (VLC) network, a system and method for communicating a plurality of medium access control (MAC) frames. The method includes providing a single frame structure to support a plurality of topologies, the plurality of topologies including peer-to-peer, broadcast, star and visibility topologies. The method also includes transmitting a plurality of frames comprising a plurality of frame types, the plurality of frame types comprising data, beacon, command, acknowledgement, and color-visibility-dimming (CVD) frames.

20 Claims, 10 Drawing Sheets

(a) PEER-TO-PEER (P2P)

(b) NEAR FIELD COMMUNICATION (NFC)

(c) VISIBLE LAN (VLAN)

(e) VEHICULAR BROADCASTING (VB)

(d) INFORMATION BROADCASTING (IB)

| FRAME FORMAT TYPE | TOPOLOGY | SLOTS USED | USE |
|---|---|---|---|
| BEACON FRAME | VLAN, IB, VB | BEACON SLOTS | USED BY INFRASTRUCTURE TO INDICATE START OF FRAME AND DEFINE NUMBER OF SLOTS TO BE ALLOCATED FOR CONTENTION, UPLINK AND DOWNLINK. IT ALSO CAN TELL LOCATION OF ACTIVE AND/OR IN-USE SLOTS AND WHICH SLOTS ARE FREE. BEACON FRAMES ARE BROADCAST, HAVE NO SECURITY AND DO NOT REQUIRE ANY ACKNOWLEDGEMENT |
| MANAGEMENT FRAME | VLAN, P2P, NFC | UPLINK, DOWNLINK, DATA SLOTS | ARE USED TO ESTABLISH NETWORK. ARE USED FOR ASSOCIATION, HIBERNATION, CHANNEL CHANGE, IDENTIFICATION, SECURITY, PHY/MAC CAPABILITIES, LOGICAL MOBILITY/HANDOFF ETC. |
| ACKNOWLEDGEMENT FRAME | VLAN, P2P, NFC | UPLINK, DOWNLINK, DATA SLOTS | ARE USED TO ACKNOWLEDGE RECEIPT OF TRANSMISSION (OR LACK OF). TRANSMITS THE RECEIVED SEQUENCE NUMBER OF FRAMES. ACKNOWLEDGEMENTS CAN BE OF MULTIPLE TYPES SUCH AS SINGLE, PACKED OR BURST TYPE |
| DATA FRAME | VLAN, P2P, NFC, VB, IB | UPLINK, DOWNLINK, DATA SLOTS | USED FOR TRANSMITTING DATA IN ALL MODES. CAN BE OF DIFFERENT TYPES SUCH AS SINGLE, PACKED OR BURST TYPE |
| CVD FRAME | VLAN, P2P, NFC, VB, IB | INFRASTRUCTURE: CONTENTION, UPLINK SLOTS, UNUSED DOWNLINK SLOTS FOR CONTINUOUS VISIBILITY MOBILE DEVICE: UNUSED SLOTS FOR POINT-AND-SHOOT | USED BY INFRASTRUCTURE TO MAINTAIN VISIBILITY AT ALL TIMES IN BETWEEN FRAMES AND DURING RX AND IDLE MODES. CAN BE USED BY MOBILE NODES FOR POINT-AND-SHOOT. SENDS A KNOWN VISIBILITY PATTERN OF A CERTAIN VISIBILITY PERCENTAGE. CAN ALSO BE USED FOR DIMMING SUPPORT WITH VISIBILITY PATTERN ADAPTED TO THE DIMMING REQUIREMENTS (WITH THE DATA BEING ADAPTED TO DIMMING PATTERN AS WELL) |

FIG. 11

| MAC HEADER FIELDS | USAGE | BEACON | MANAGEMENT | ACKNOWLEDGEMENT | DATA | CVD |
|---|---|---|---|---|---|---|
| VERSION NUMBER | ALLOWS TO DISTINGUISH FUTURE VERSIONS OF THE STANDARD | SET TO DEFAULT FOR CURRENT STANDARD VERSION ||||  |
| SECURE | DETERMINES WHETHER FRAME IS SECURE | NO SECURITY | | FRAME DEPENDENT | | NO SECURITY |
| ACK POLICY | DETERMINES THE ACKNOWLEDGEMENT POLICY USED | NO ACK | | FRAME DEPENDENT | | NO ACK |
| FRAME TYPE | DETERMINES THE TYPE OF FRAME, E.G., BEACON, MANAGEMENT, DATA | BEACON | MANAGEMENT | ACKNOWLEDGEMENT | DATA | VISIBILITY |
| FRAME SUB TYPE (DEPENDANT ON FRAME TYPE) | VALUES IN THIS FIELD ARE DEPENDENT ON THE FRAME TYPE | IB, VB, VLAN | ASSOCIATION, HIBERNATION, CHANNEL CHANGE, DEVICE ID, PHY/MAC CAPABILITIES, SECURITY, MOBILITY | ACK, NO ACK, NEGATIVE ACK, BURST ACK, BURST NEGATIVE ACK | SINGLE, PACKET, BURST | PERCENTAGE VISIBILITY (OR DIMMING) |
| RETRY | DETERMINES IF ANY RETRY IS NEEDED | NO RETRY | | FRAME DEPENDENT | FRAME DEPENDENT | NO RETRY |
| SRC ADDRESS | SOURCE ADDRESS OF TX | | | | | |
| DESTINATION ADDRESS | RECEIVER ADDRESS-TO IDENTIFY INTENDED RECIPIENT OR RECIPIENTS IN CASE OF MULTICAST OR BROADCAST | BROADCAST | | FRAME DEPENDENT | FRAME DEPENDENT | |
| SEQUENCE NUMBER | TELLS SEQUENCE NUMBER OF CURRENT PDU | NO SEQUENCE NUMBER | | | FRAME DEPENDENT | NO SEQUENCE NUMBER |
| NUM PDUs PER FRAME | TELLS HOW MANY PDUs CAN BE EXPECTED IN THIS FRAME | SINGLE |||| 1 FOR SINGLE, 'n' FOR PACKET, BURST | NO PDUs |
| RESERVED FIELDS | ALLOWS FOR FUTURE EXPANSIONS OF THE MAC HEADER | NOT CURRENTLY USED |||||  |

FIG. 12

FLEXIBLE AND INTEGRATED FRAME STRUCTURE DESIGN FOR SUPPORTING MULTIPLE TOPOLOGIES WITH VISIBLE LIGHT COMMUNICATION

CROSS-REFERENCE TO RELATED APPLICATION(S) AND CLAIM OF PRIORITY

The present application is related to U.S. Provisional Patent Application No. 61/276,729, filed Sep. 16, 2009, entitled "FLEXIBLE AND INTEGRATED FRAME STRUCTURE DESIGN FOR SUPPORTING MULTIPLE APPLICATIONS WITH VISIBLE LIGHT COMMUNICATION". Provisional Patent Application No. 61/276,729 is assigned to the assignee of the present application and is hereby incorporated by reference into the present application as if fully set forth herein. The present application hereby claims priority under 35 U.S.C. §119(e) to U.S. Provisional Patent Application No. 61/276,729.

TECHNICAL FIELD OF THE INVENTION

The present application relates generally to visible light communication and, more specifically, to a flexible frame structure design that supports multiple visible light communication topologies.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with radio frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

Figure 1:
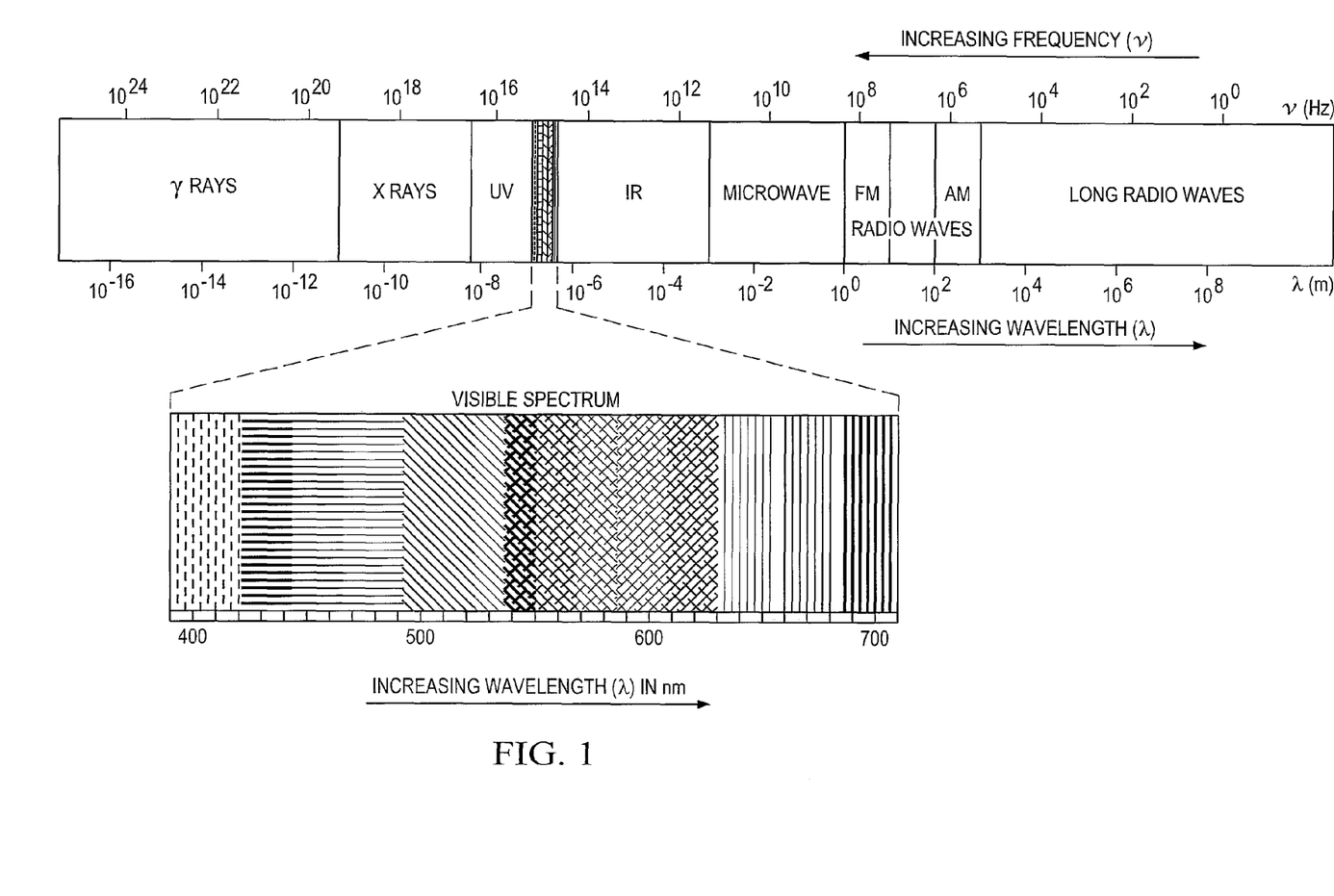
FIG. 1 depicts the full electromagnetic frequency spectrum, and a breakout of the wavelengths occupied by visible light.

FIG. 1 depicts the full electromagnetic frequency spectrum, and a breakout of the wavelengths occupied by visible light. The visible light spectrum extends from approximately 380 to 780 nm in wavelength, which corresponds to a frequency range of approximately 400 to 790 THz. Since this spectrum is large and can support light sources with multiple colors, VLC technology can provide a large number of channels for communication.

SUMMARY OF THE INVENTION

For use in a visible light communication (VLC) network, a method for communicating a plurality of medium access control (MAC) frames is provided. Each MAC frame is associated with a configurable MAC frame structure, and the MAC frame structure is configurable for multiple VLC topologies. The method includes providing a single frame structure to support a plurality of topologies, the plurality of topologies including peer-to-peer, broadcast, star and visibility topologies. The method also includes transmitting a plurality of frames comprising a plurality of frame types, the plurality of frame types comprising data, beacon, command, acknowledgement, and color-visibility-dimming (CVD) frames.

For use in a VLC network, a transmitter configured to transmit a plurality of MAC frames is provided. The transmitter is configured to provide a single frame structure to support a plurality of topologies, the plurality of topologies including peer-to-peer, broadcast, star and visibility topologies. The transmitter is also configured to transmit a plurality of frames comprising a plurality of frame types, the plurality of frame types comprising data, beacon, command, acknowledgement, and color-visibility-dimming (CVD) frames.

Another method for use in a VLC network is provided. The method includes configuring each slot in a first MAC frame for a first data type. The method also includes transmitting the first MAC frame in a first VLC topology. The method further includes configuring each slot in a second MAC frame for a second data type. The method also includes transmitting the second MAC frame in a second VLC topology. At least one slot in the first MAC frame is configured to a different data type than a corresponding slot in the second MAC frame.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 provides a table of frame format types, according to embodiments of the present disclosure;

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

The following documents and standards descriptions are hereby incorporated into the present disclosure as if fully set forth herein:

Visibility for VLC on TRD: IEEE 802.15-09-0372-01-0007;

IEEE 802.15.7, found at the time of filing at http://www.ieee802.org/15/pub/TG7.html;

ECMA TC-47, found at the time of filing at http://www.ecma-international.org/memento/TC47-M.htm;

TG7 Technical Considerations Document: IEEE 802.15-09-0564-01-0007;

ECMA 368, found at the time of filing at http://www.ecma-international.org/publications/standards/Ecma-368.htm; and IEEE 802.15.4, found at the time of filing at http://www.ieee802.org/15/pub/TG4.html.

Figure 2:
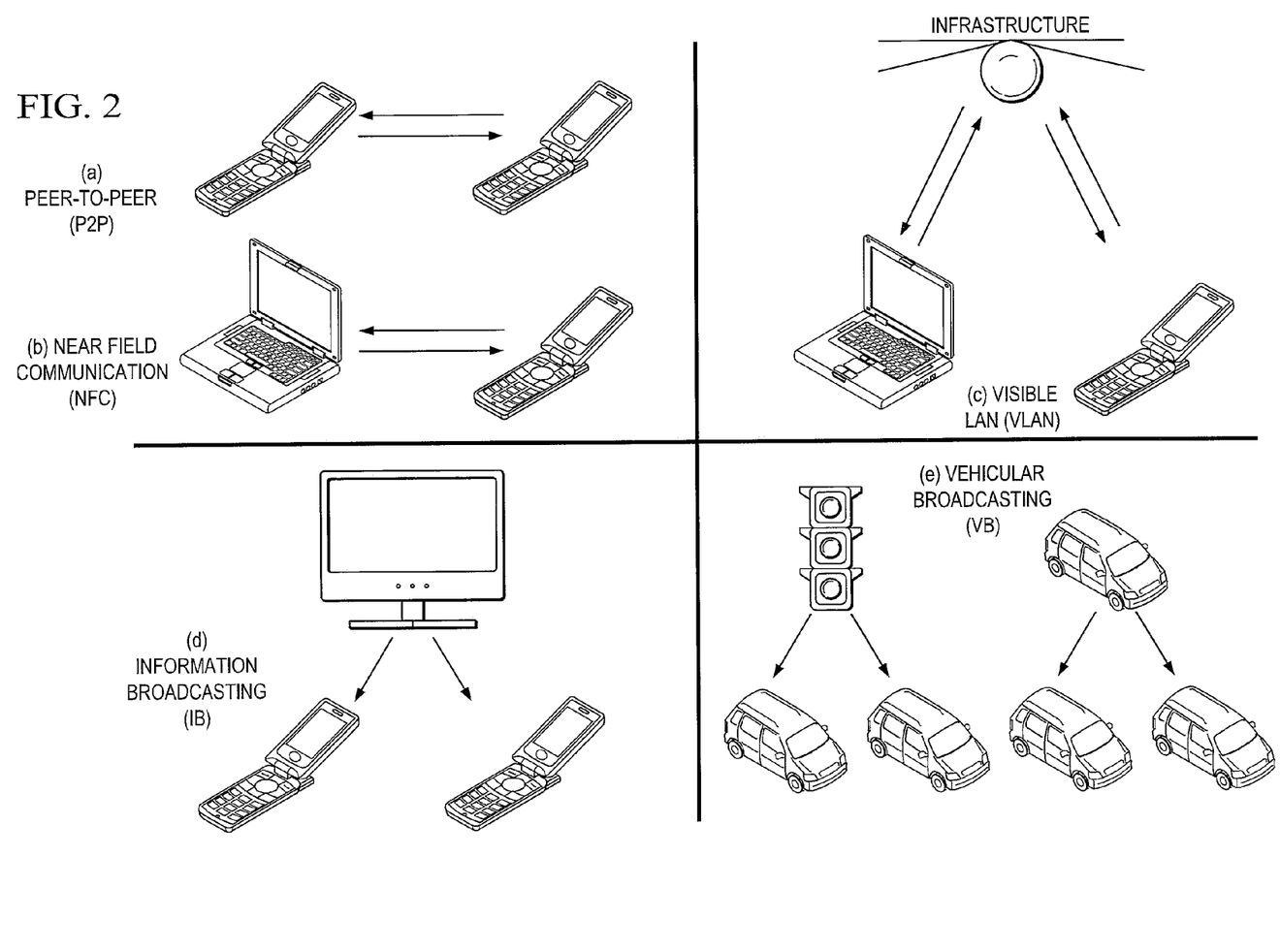
FIG. 2 depicts several exemplary VLC topologies.

VLC enables a wide range of topologies with diverse requirements. FIG. 2 depicts several exemplary VLC topologies. FIG. 2(a) shows an example of peer-to-peer (P2P) communication. In this example, a mobile phone communicates with another mobile phone using VLC. FIG. 2(b) shows an example of another type of P2P VLC communication known as near field communication (NFC). NFC may be used where the communication distance is very short (<30 cm or so). In NFC, very high data rates (>100 Kbps) can be attained. In the example shown, a mobile phone communicates with a laptop computer using VLC.

FIG. 2(c) shows an example of a visible LAN (ULAN) system where the infrastructure lighting system also functions as an access point and enables LAN service to one or more devices, such as a laptop or a mobile phone. FIG. 2(d) shows an example of an information broadcasting (IB) system where a display at a public location (e.g., a mall or museum) could broadcast information (e.g., information about facilities, directions, or services) using VLC. Devices (e.g., mobile phones) that are in range of the broadcast may then receive the information. FIG. 2(e) shows an example of the use of VLC for vehicular broadcasting (VB) topologies such as conveying safety or traffic information from traffic signals or from other cars. It will be understood that the VLC topologies and devices shown in FIG. 2 are for example purposes only. Other VLC topologies and devices are possible.

One characteristic of many VLC topologies is that an infrastructure light source (e.g., overhead ambient light) may need to be maintained in an "ON" state to avoid loss of transmission (TX) output and to avoid flicker during downlink transmissions. Continuous "ON" is also important for VLAN uplink and P2P topologies that support point-and-shoot techniques to focus the light on the receiver for optimal communication (i.e., pointing). One method for ensuring a continuous "ON" state is shown in FIG. 3.

Figure 3:
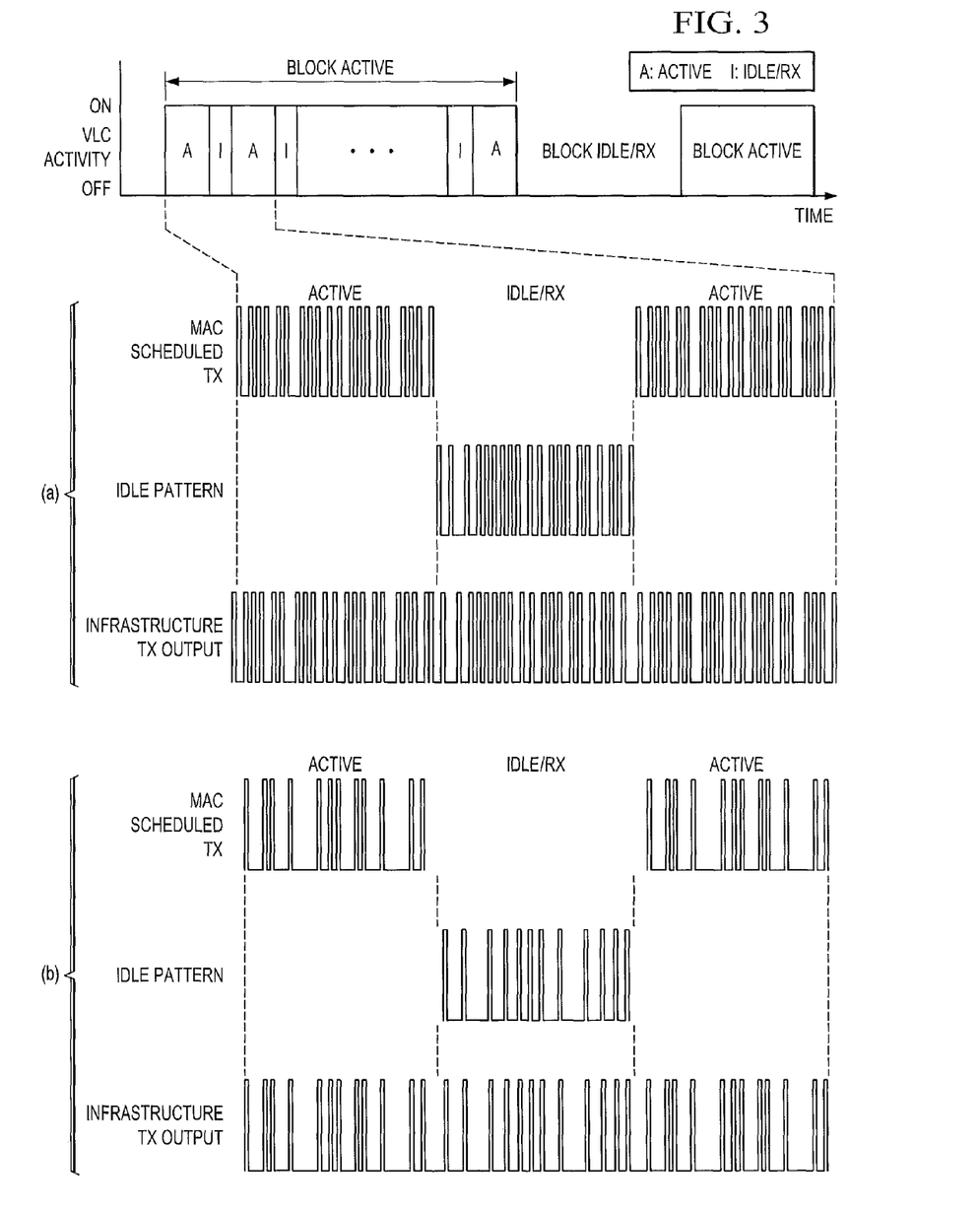
FIG. 3 depicts an idle/receiving state signal that is transmitted during idle or receiving states of an infrastructure light source, according to one embodiment of the present disclosure.

FIGS. 3(a) and 3(b) depict an idle/receiving (idle/RX) state signal that is transmitted during idle or receiving states of an infrastructure light source, according to embodiments of the present disclosure. If a light source transmits at certain intervals, and is then idle between those intervals, visible flicker in the light source can result. An idle/receiving state signal can be used to maintain optimal visibility and flicker-free operation during idle or receiving periods at the infrastructure. This is accomplished by the idle/receiving signal generally or substantially (but not necessarily exactly) emulating the pattern of the active transmission signal. Specifically, the idle/receiving signal has generally the same duty cycle that is used during the active signal.

Looking at the scheduled TX signals in FIG. 3(a), it is seen that two active transmission blocks are separated by an idle/receiving block. To reduce flickering, an idle/RX state signal is generated to be transmitted during the idle/receiving block. When the idle/RX state signal is transmitted during the idle/receiving block, the result is a substantially regular output signal by the light source. Accordingly, the flicker or visibility effects that would be seen during idle periods are reduced or eliminated. FIG. 3(a) depicts transmitting an idle/RX state signal when a dimmer is set for high brightness, and FIG. 3(b) depicts transmitting an idle/RX state signal when the dimmer is set for low brightness.

Transmission of data signals during idle/RX periods in order to control visible flicker is unique to VLC. The ability to control flicker in this manner is often called visibility support, and the signal patterns transmitted during idle blocks are often called visibility patterns.

In addition to maintaining continuous visibility during idle times, these visibility patterns can be used by the receiver (assuming in-band visibility patterns) to estimate the compensation factors needed for color stabilization of the infrastructure transmitting device. If desired by the transmitter and supported by the receiver, the receiver can compute the compensation factors during idle time operation. The transmitter can apply the received compensation factors for stabilizing the color of the emitted light.

A specification for standardization of visible light communication is currently being developed for IEEE 802.15.7. VLC is also under consideration in ECMA TC-47 for near field communication topologies. In IEEE 802.15.7, three classes of VLC devices are considered: infrastructure, mobile and vehicle-mounted. Each topology class described in the IEEE 802.15.7 application summary document supports both uni- and bi-directional data transfer, with peer-to-peer or point-to-multipoint connectivity. Table 1 shows the different classes of devices discussed in the TG7 Technical Considerations Document. In Table 1, the following legend applies:

Short range: expected operational range <=3 m.
Long range: expected operational range >3 m.
Low data rate: PHY data rate <1 Mbps
High data rate: PHY data rate >=1 Mbps

TABLE 1

Device Classification

|  | Infrastructure | Mobile | Vehicle-mounted |
|---|---|---|---|
| Fixed access point | Yes | No | No |
| Power supply | Ample | Limited | Moderate |
| Form factor | Unconstrained | Constrained | Unconstrained |
| Light source | Intense | Weak | Intense |
| Physical Mobility | No | Yes | Yes |
| Range | Short/long | Short | Long |
| Data rate | High/Low | High | Low |

While separate medium access controller (MAC) protocols have been designed for many of the above topologies, there is a need to support all of these diverse VLC topologies in a single, integrated frame structure with low complexity so that devices such as mobile phones can be built to support multiple topologies with a single common MAC protocol for area, power and performance benefits. Some aspects could also be made optional for devices that do not wish to support those topologies.

Standards such as IEEE 802.15.4 also provide support for peer-to-peer and star topologies using beacon and non-beacon modes. However, the frame structure described in IEEE 802.15.4 is not generic enough to meet all of the VLC topology requirements mentioned above. For example, it does not support flexible preamble lengths or multiple data types or visibility and dimming support that are unique to VLC.

Figure 4:
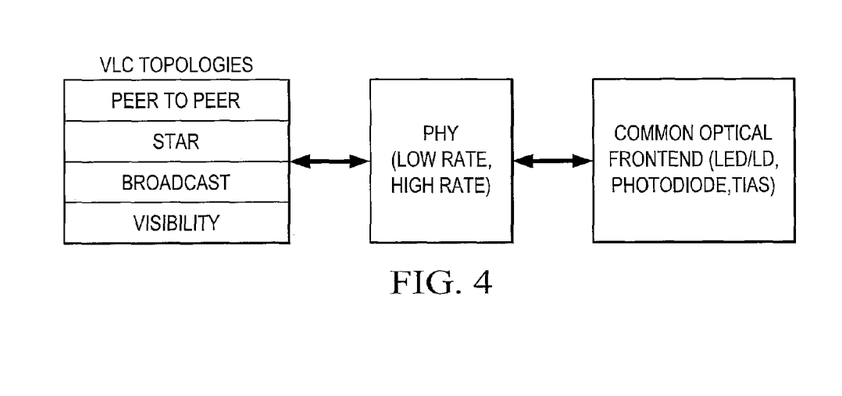
FIG. 4 depicts a single medium access control (MAC) protocol design that supports multiple VLC topologies, according to embodiments of the present disclosure.

FIG. 4 depicts a single MAC protocol design that supports multiple VLC topologies, according to embodiments of the present disclosure. With such an integrated solution, front-end optics, such as optical light sources (e.g., LEDs or laser diodes) and drivers, receiving photodiodes, transimpedance amplifiers (TIA), and parts of the PHY and MAC protocols, can be shared for multiple topologies while simultaneously making it possible to make a single low complexity device that supports all these topologies. The MAC protocol design shown in FIG. 4 provides a single integrated frame structure configured to support these multiple topologies.

Another issue related to VLC is the need to have long training preambles for training the optical front end. This can be especially true in the case of interference or if an image sensor is being used as the receiving device. The preamble length will also vary, depending on the topology and the environment (e.g., an indoor environment versus an outdoor environment). Such long preambles may have a significant impact on performance. Standards such as ECMA-368 provide options for reducing the preamble length to a fixed, smaller length for burst transmissions. However, due to the wide range of topologies, it is advantageous to have a frame structure with a flexible preamble length that is configurable for different topologies. Embodiments of the present disclosure provide a system and method of supporting flexible preamble lengths in a flexible frame structure.

For maximum flexibility, it is beneficial for the data frames for VLC to support multiple topologies. For some VLC topologies, such as vehicular topologies, typical data transfer might be only a few bytes. For other topologies, such as near field communication, there may be a sustained data transfer from a single device to another device in a peer-to-peer fashion. Embodiments of the present disclosure support multiple data topologies for different types of VLC traffic.

Figure 5:
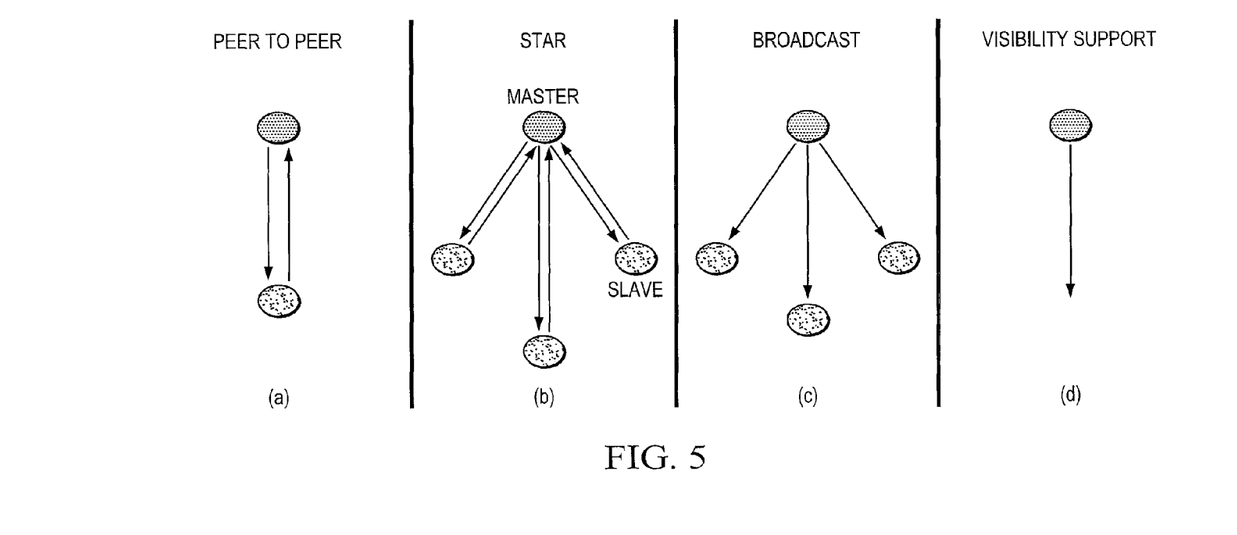
FIG. 5 depicts exemplary topologies supported by the flexible MAC frame structure of the present disclosure.

This disclosure provides a single integrated and flexible MAC frame structure that supports multiple, diverse VLC topology requirements. FIG. 5 depicts exemplary topologies supported by the flexible MAC frame structure of the present disclosure. For example, the flexible MAC frame structure supports peer-to-peer topology (shown in FIG. 5(a)). One type of VLC communication using peer-to-peer (P2P) topology is near field communication (NFC). The flexible MAC frame structure also supports star topology (shown in FIG. 5(b)). An example of VLC communication using star topology is visible LAN (VLAN). The flexible MAC frame structure also supports broadcast topology (shown in FIG. 5(c)). VLC communication methods using broadcast topology include information broadcasting (IB) and vehicular broadcasting (VB). The flexible MAC frame structure also supports visibility transmissions (shown in FIG. 5(d)). Thus, bi-directional, multicasting, and broadcasting capabilities may be supported with this single MAC frame structure.

Figure 6:
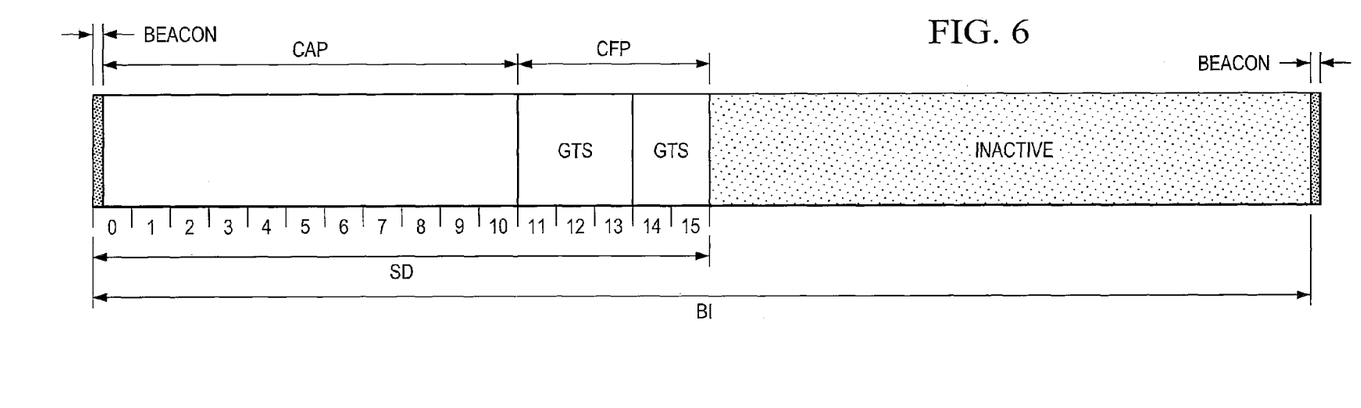
FIG. 6 illustrates an example of a superframe structure according to embodiments of the present disclosure.

FIG. 6 illustrates an example of a superframe structure according to embodiments of the present disclosure. A superframe is bounded by the transmission of a beacon frame and can have an active portion and an inactive portion. The active portion of each superframe is divided into a number of equally spaced slots and is composed of three parts: a beacon, a contention access period (CAP) and a contention-free period (CFP).

Typically, the CAP starts immediately following the beacon and completes before the beginning of the CFP on a superframe slot boundary. If the CFP is zero length, the CAP completes at the end of the active portion of the superframe. The CFP typically starts on a slot boundary immediately following the CAP and completes before the end of the active portion of the superframe. If any GTSs have been allocated, they may be located within the CFP and occupy contiguous slots. The CFP may therefore grow or shrink depending on the total length of all of the combined GTSs. Communication between devices can take a variable number of slots. A single device or user can have access to more than a single slot for sustained data transfer in the frame, if there are slots available.

As shown in FIG. 6, the beacon interval, BI, is twice as long as the active superframe duration, SD, and the CFP contains two GTSs.

Figure 7:
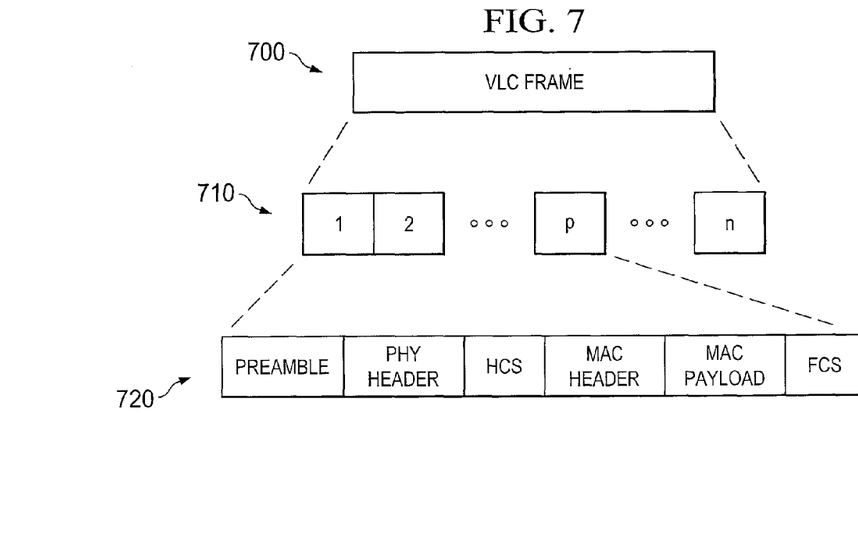
FIG. 7 depicts an example of slot usage by a particular VLC device, according to embodiments of the present disclosure.

FIG. 7 depicts an example of slot usage by a particular VLC device, according to embodiments of the present disclosure. MAC frame 700 is composed of a variable number of slots 710, labeled 1 through n. A slot may be defined as the minimum time needed to send a predetermined amount data to a device. In typical embodiments, the duration of a slot is fixed. The number of slots 710 in VLC MAC frame 700 is communicated in the MAC header. The slots 710 may be called "virtual" slots, because each slot 710 may be defined and used differently in different VLC topologies.

Communication between VLC devices can take $1 \leq p \leq n$ slots, where 'p' is a positive integer and 'n' is the total number of slots in the frame. Thus, a single device or user can have access to more than a single slot for sustained data transfer in the frame, if there are slots available. The type of frame for the topology and the number of slots can be indicated in the MAC header. Transmission between two devices typically involves transmission of a preamble, a PHY header, a header check sequence (HCS), a MAC header and payload, and a frame check sequence (FCS), as generally indicated at 720. However, it will be understood that certain topologies may not require every one of these sections. For example, a color-visibility-dimming (CVD) frame may be used for (c)olor, (v)isibility and (d)imming support. The CVD frame visually provides information such as communication status and channel quality to the user, via the various colors. The CVD frame is also sent during idle or receive modes of operation for continuous visibility and dimming support. During the CVD frame transmission, the device is still emitting light while not communicating, and it is thus able to fulfill its lighting function. The payload of a CVD frame consists of visibility patterns of appropriate intensity and color. In certain embodiments, the preamble is used for synchronization of the frames in the different topologies.

Figure 8:
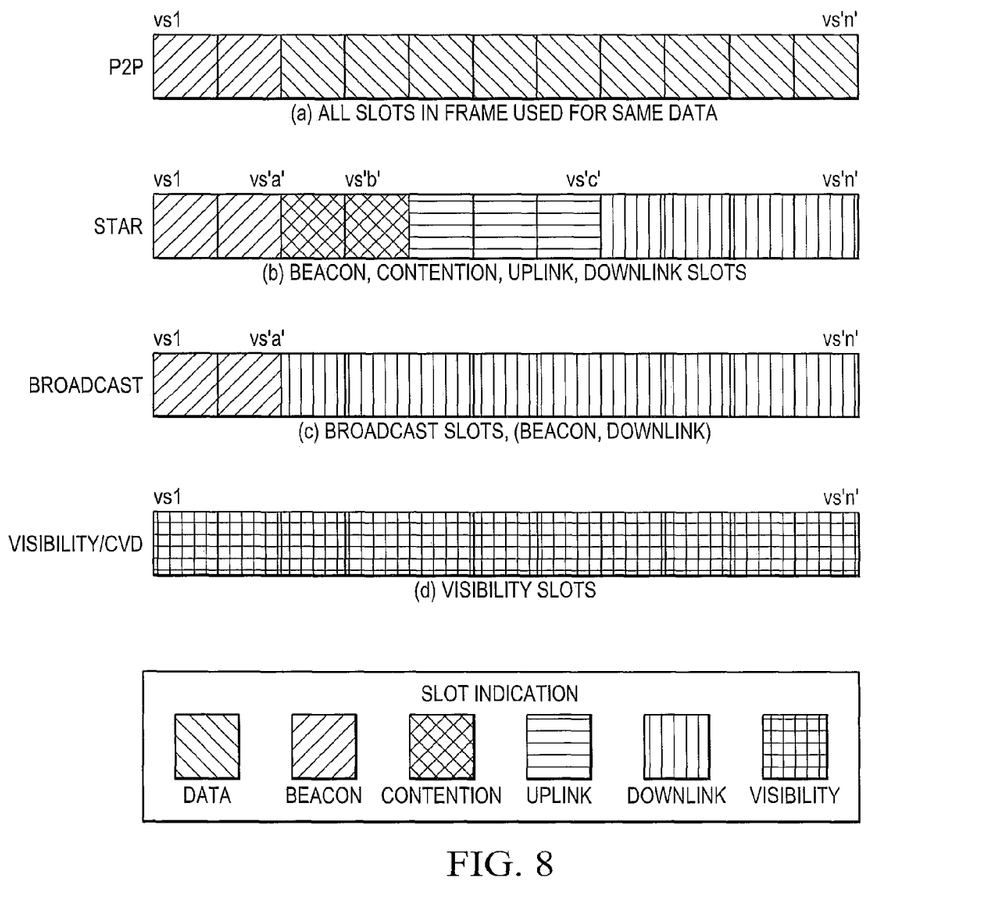
FIG. 8 depicts example uses of frame structures for different VLC topologies, according to embodiments of the present disclosure.

FIG. 8 depicts example uses of frame structures for different VLC topologies, according to embodiments of the present disclosure. Depending on the topology, each virtual slot is configured for transmission of one of six different types of data: payload data, beaconing, contention management, uplink, downlink, and visibility support. For example, for communication using a peer to peer topology (e.g., NFC and P2P), as shown in configuration (a), each slot is configured for payload data. In other words, each slot is configured to support the transfer of payload data between the two devices.

For communication using a star topology (e.g., VLAN), as shown in configuration (b), the first 'a' slots are used for beaconing from the infrastructure device to indicate the start timing and to indicate how the slots are configured for a given topology. Slots (a+1) to 'b' are configured for contention management for devices to join the access point. Slots (b+1) to 'c' may be used for uplink access by the various devices that are associated with the access point. Slots (c+1) to 'n' may be used for downlink transmissions by the access point.

In communication using a broadcast topology (e.g., IB and VB), as shown in configuration (c), all slots are again configured in the same direction (downlink) for broadcasting. The first 'a' slots are used for beaconing to indicate the start of a frame and to indicate which slots are actively used for broadcasting. Looking at FIG. 8, it is clear that the slot configuration for the broadcast topology (configuration (c)) may be formed by simply eliminating the contention and uplink slots in the slot configuration for the star topology (configuration (b)). Depending on the topology, the slot markers 'a', 'b', and 'c' can take any value from '0' to 'n'. Thus, the slots can be flexibly configured according to the requirements of a given topology.

FIG. 8(d) depicts a visibility support technique where the slots are simply configured for transmission of visibility patterns to assist with alignment for data transmission for uplink or to keep the infrastructure transmissions always "on" for downlink and to remove flicker. There is no MAC payload or FCS for a CVD (color/visibility/dimming) frame. However, in certain embodiments, the CVD frame includes a PHY header and MAC header. The PHY header and MAC header in a CVD frame allow the receiving device or devices to ignore the pattern and go into power saving or hibernation states until the end of the frame. The CVD frame can also tell the receiver the actual pattern being sent, which can be used for synchronization and for gain (channel) estimation and compensation.

In certain embodiments, there may be a need for guard time between the different slot configuration changes to enable the transition from uplink to downlink and vice-versa. For example, guard time may be needed between a beacon slot (downlink) and an adjacent contention slot (uplink). The guard time may be as short as short inter-frame spacing (SIFS), which is commonly used to demarcate frame transitions in the MAC. Since the transmitter and receiver use independent circuitry for VLC, it is also possible that the guard time could be reduced significantly or even avoided. This is in contrast to other wireless systems that share the transmitter and receiver circuitry.

Although the embodiments described above show the virtual slot concept to be time-division duplex (TDD) based, it will be understood that the flexible MAC frame concept of the present disclosure can be extended to frequency division duplex (FDD) as well. Of course, in a FDD configuration, additional support for multiple frequency bands at the transmitter and receiver may be needed.

In certain embodiments that employ a star topology (e.g., VLAN), the frame starts with the beacon slots and the uplink slots are allocated right after the contention management slots. The downlink slots then follow the uplink slots. The beacon is used to indicate how the slots are configured for star and broadcast topologies. The access point may receive continuously during contention and uplink and then switch to transmissions on the downlink. In other embodiments, the slots allocated to uplink and downlink may not be contiguous. It will be understood that the MAC frame structure provided in this disclosure can support configuration of all slots for contention, uplink and downlink in any combination and order.

Figure 9:
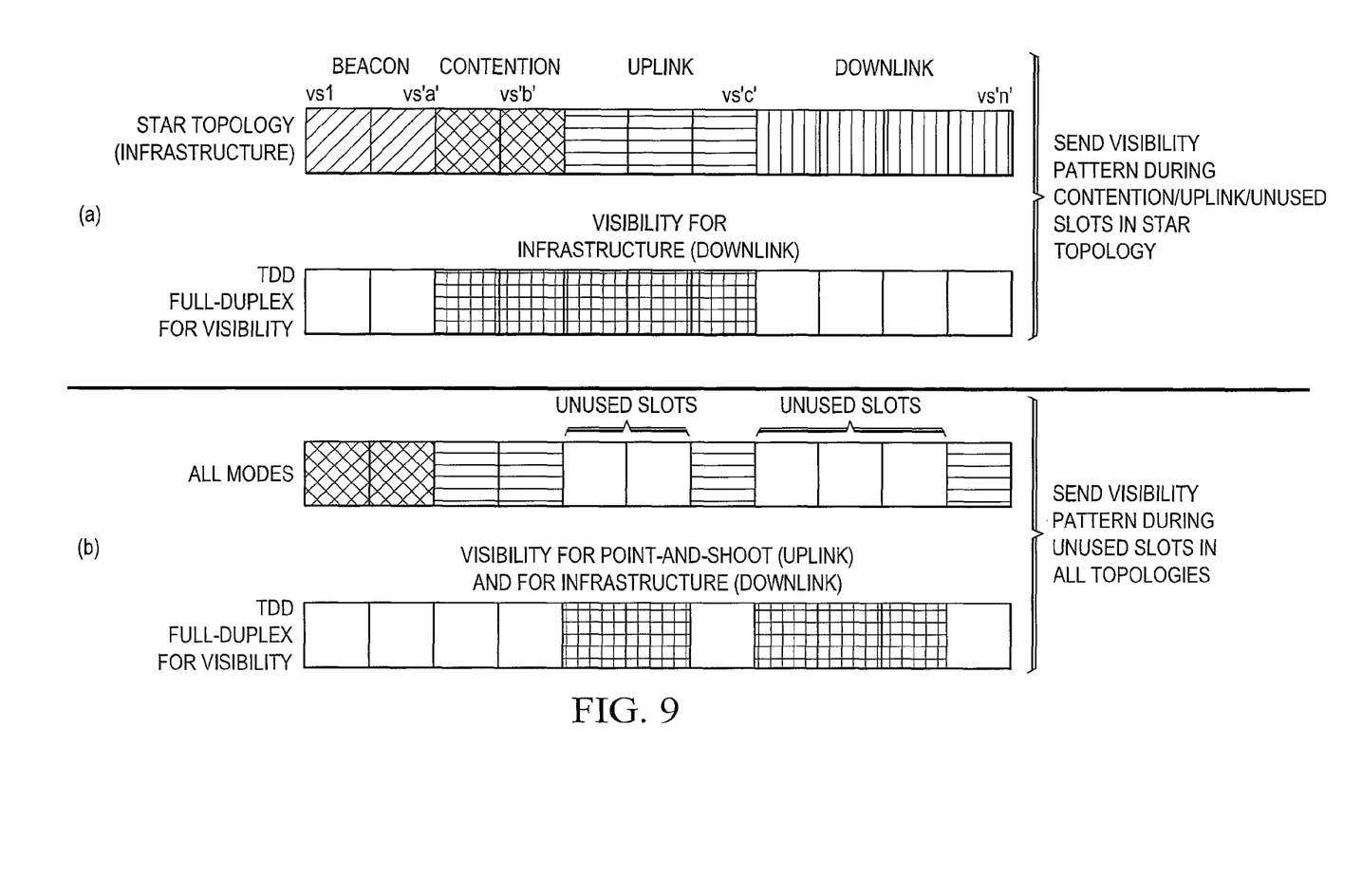
FIG. 9 depicts usage of CVD frames during an idle or receive mode, according to embodiments of the present disclosure.

FIG. 9 depicts usage of CVD frames during an idle or receive mode, according to embodiments of the present disclosure. As shown in FIG. 9, one or more visibility patterns may be transmitted during one or more receive and/or idle slots. For example, FIG. 9(a) shows a star topology that transmits a visibility pattern during contention and uplink slots. Likewise, FIG. 9(b) shows that one or more visibility patterns may be transmitted during any or all unused slots in all topologies.

The visibility pattern is used to maintain visibility, reduce flicker and keep the transmitter always "ON" for the infrastructure. This is an important distinguishing feature of the flexible VLC MAC frame structure. Thus, although TDD duplexing and half-duplexing can be used for data communication, visibility patterns may need to be transmitted during receive and idle intervals using a full duplex operation to maintain and support visibility. The full duplexing in TDD communication is possible due to spatial separation of the light source and the receiving circuitry. As shown in FIG. 9, visibility patterns are sent during contention, uplink slots and unused downlink slots by the infrastructure to maintain visibility. Visibility patterns are also sent during unused slots by the mobile device to help with pointing and alignment for optimal data transfer.

If the continuous visibility mode is indicated (e.g., a continuous visibility bit is set), then infrastructure devices with continuous visibility may use this mode of TDD full duplex for visibility.

FIG. 10 provides a table of frame format types, according to embodiments of the present disclosure. The frame format types in the table may be used to support the diverse requirements for VLC. The table of FIG. 10 shows five frame format types: beacon frame, MAC command frame (sometimes referred to as "management" frame), acknowledgement frame, data frame, and CVD frame.

As seen in FIG. 10, the CVD frame may be used by the infrastructure to maintain proper light intensity between data frames, support dimming, and visually provide information (e.g., communication status and channel quality) to the user. In certain embodiments, the visibility level is two bytes long and contains a value between 0 and 1000, where 0 represents 0% visibility and 1000 represents 100% visibility. Values 1001 through 1023 are reserved values. The visibility levels may be defined with a resolution of 0.1%. There is no FCS required for the CVD frame. The transmitted visibility pattern may have the same resolution that is mentioned in the visibility level. If there is a dimmer, the dimming level may be indicated as the visibility level. In certain embodiments, the visibility pattern is generated by the PHY based on the visibility level setting.

Although five frame formats are shown, it will be understood that other frame formats may be possible. Such additional frame formats are within the spirit and scope of this disclosure. As can be seen from the table, not all frame formats need to be supported by all topologies. For example, in certain embodiments, acknowledgement and command frames may be ignored by devices that support only VB and IB. Similarly, beacon frames may be ignored by devices supporting only NFC and P2P communications. A multi-function device could support all the topologies of FIG. 10 using a single MAC frame format structure of the present disclosure and these frame types.

Figure 11:
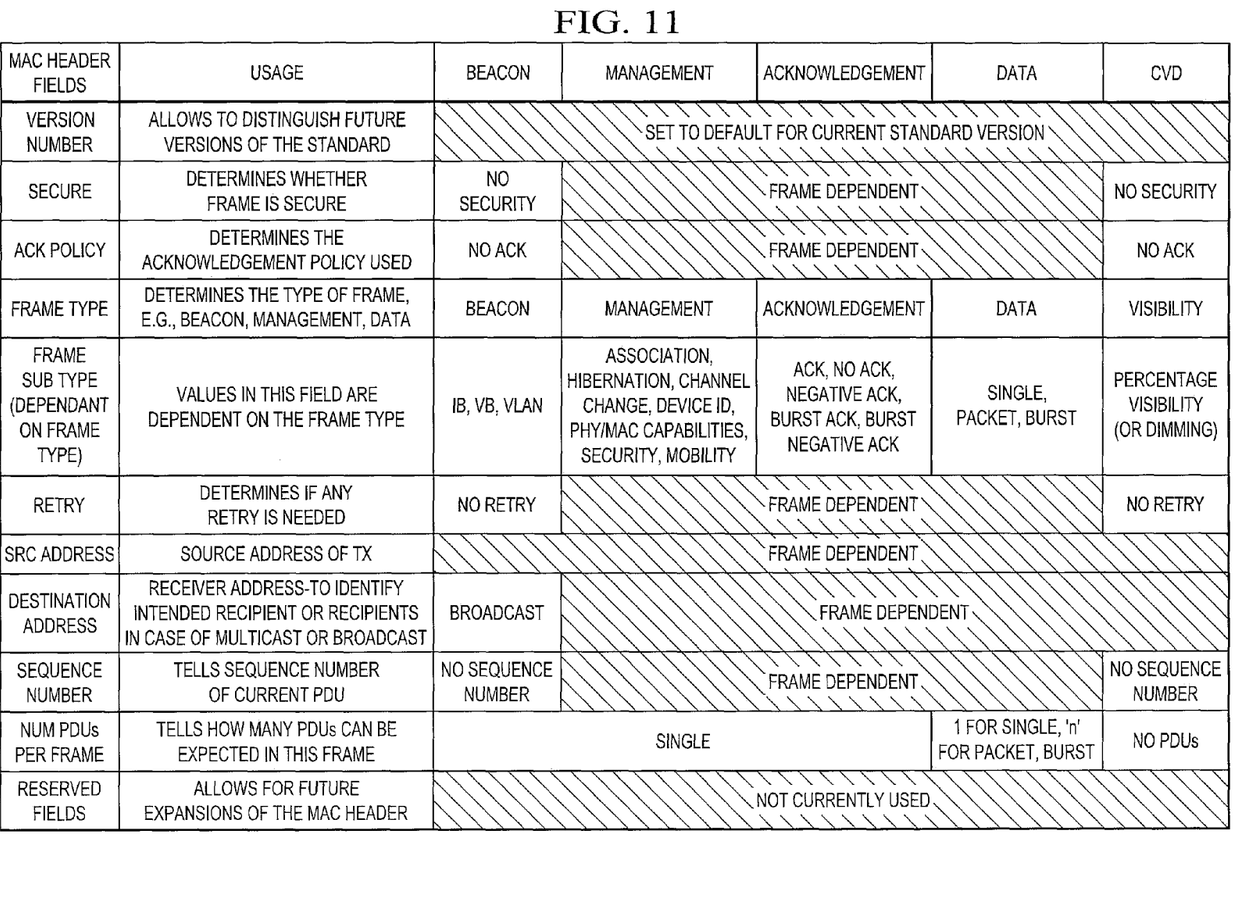
FIG. 11 provides a table that lists a number of MAC header fields, according to embodiments of the present disclosure.

FIG. 11 provides a table that lists a number of MAC header fields, according to embodiments of the present disclosure. A MAC header according to some embodiments includes one or more of the header fields listed in the table. The fields are provided in the MAC header to allow the MAC header to distinguish different topologies. A single, flexible MAC header can be adapted for different VLC topologies. Depending on the requirements of the VLC topology, the fields of the MAC header are set to accommodate the topology. All the information about the topology and the aspects of communication can be derived from the single MAC header. By providing the following fields in the MAC header, no other information is needed to distinguish multiple topologies. The receiver can process the data contained for the given topology without requiring any additional fields.

In FIG. 11, the unshaded values for the different frame types show fixed values that are set to differentiate the different VLC topologies. For example, by examining the ACK Policy header field, it is seen that the beacon and CVD frames do not require any acknowledgement (ACK). The shaded values are set in a frame dependent manner, depending on the topology. For example, an examination of the Secure header field indicates that data frames may be secure or not secure, depending on the topology.

Some of the VLC-specific fields of the single MAC header will now be described to explain how the MAC header fields can be used to implement the specific requirements of the VLC protocol.

The Frame Type field determines the type of frame, and allows specification of VLC-specific frame types, such as the CVD frame. Setting the Frame Type to visibility indicates that there is no payload in the MAC and a visibility pattern will be sent instead.

The Frame Sub-Type field allows specification of VLC-specific frame sub-types. For example, in a beacon frame for VLAN, IB, and VB topologies, the frame sub-type clearly indicates the VLC topology. This can be used as the filtering mechanism in the MAC for associations. The payload in the beacon frame can indicate the number of slots used in the frame, the number of contention slots, uplink and downlink slots (as applicable). The beacon can also indicate the number of active or in-use slots in the frame and their location.

In a CVD frame, the frame sub-type indicates the visibility or dimming percentage. This field informs the receiver of the dimming pattern or visibility pattern that is being used. The receiver can use this information to ascertain the pattern that is expected to be sent by the transmitter. The clock-and-data recovery circuit can then use this information to acquire the synchronization pattern. Additionally or alternatively, the channel estimation circuit can use this information to provide a better gain compensation for performance improvement for frames containing data or control.

In another embodiment, multiple MAC header fields may be jointly coded in order to minimize the MAC header size. For example, the Frame Sub-Type field for a CVD frame may need a larger number of bits (e.g., 10 bits) to fully indicate the visibility pattern. However, if 10 bits were allocated for the Frame Sub-Type field, many of those bits would be wasted in other topologies. However, a CVD frame does not require a sequence number. Therefore, the Sequence Number field could be re-mapped (or jointly mapped with the Frame Sub-Type field) to indicate part or all of the visibility pattern for the CVD frame. Doing so would permit the Frame Sub-Type field to be smaller than 10 bits, thus making the MAC header more compact.

It is noted that the CVD frame is just one example. This concept may be expanded to include other fields and other frame types in the MAC header.

In another embodiment, the flexible MAC header may provide variable preamble repetitions, depending on the type of topology. Topologies such as NFC have high data rate requirements and operate at very small distances. Hence, they can operate with a reduced preamble repetition. In contrast, topologies such as vehicular broadcasting operate over significant distances (up to 100 m), may have interference from other light sources (e.g., sunlight), and may use special receiver optics for training. These topologies require significantly larger preamble repetitions and low data rates. The VLC standard may allow a variable number of preamble transmissions that can be set by the MAC. For example, Table 2 shows the number of preamble repetitions that may be required by different topologies. This information need not be conveyed to the receiver since all receivers are meant to work with a variable number of preambles (above a certain minimum number) until a cover sequence marker that marks the end of the preamble is reached.

TABLE 2

Topology-Dependent Preamble Repetitions

| Topology | Number of preamble repetitions |
|---|---|
| NFC | 32 |
| P2P | 64 |
| VLAN | 128 |
| IB | 128 |
| VB | 1024 |

Figure 12:
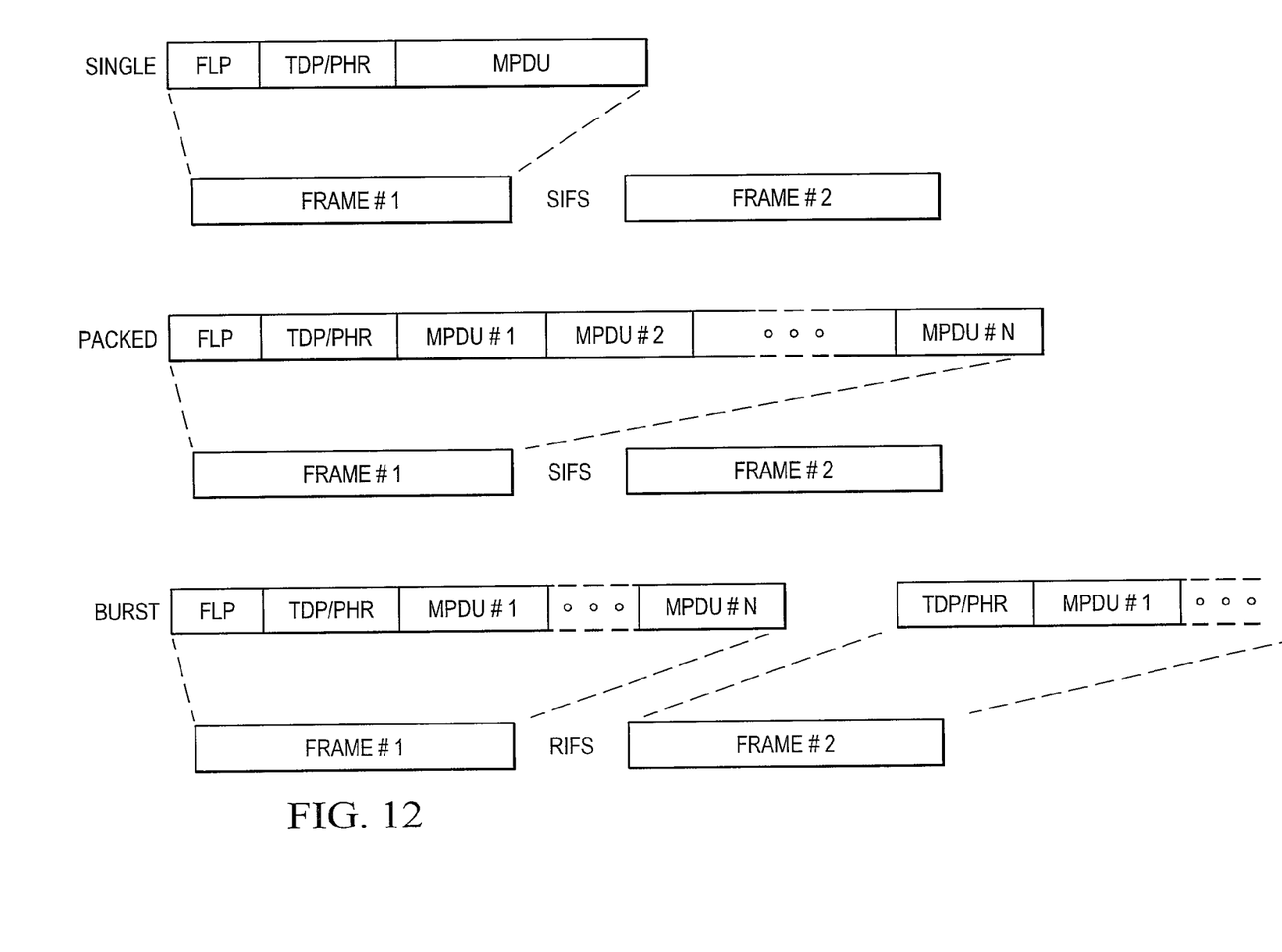
FIG. 12 depicts multiple methods for transmitting data and control between the transmitter and receiver in different VLC topologies, according to embodiments of the present disclosure.

FIG. 12 depicts multiple methods for transmitting data and control between the transmitter and receiver in different VLC topologies, according to embodiments of the present disclosure. The single, packed, and burst transmission modes shown in FIG. 12 operate with reduced preamble repetition options for different VLC topologies. In addition, there is a fourth mode for data transfer known as "dimmed OOK" mode. This mode may be used for data transmission while dimming.

In single transmission mode, there is only one PDU transferred per frame. Single transmission mode is used for very short data communication, such as acknowledgements, association, or beaconing, or for information broadcasting topologies. Packed transmission mode is used to send multiple consecutive PDUs within the same frame to the same destination for high throughput. Thus, in packed transmission mode, the overhead of sending multiple MAC and PHY headers to the same destination is eliminated, providing higher MAC efficiency. Packed transmission mode can be used in most modes as the preferred means of data communication in most topologies.

In some embodiments, it is also possible for certain types of communication (e.g., NFC and P2P) to send long streams of data to the same destination across multiple frames. In such cases, the burst transmission mode can be used that has a reduced length PHY preamble, and/or reduces the preamble repetitions and the interframe spacing (IFS) between the consecutive frames. The shorter preamble improves the throughput of the system and eliminates the inefficiency of retraining the receiver since the previous frame was also sent to the receiver from the same transmitter. The Short Interframe Spacing (SIFS) between frames may also be reduced to Reduced Interframe Spacing (RIFS) since the next frame is also from the same source for the same destination. In certain embodiments, the number of preamble repetitions in the burst transmission is flexible. This allows the transmitter and receiver to optimize the preamble repetitions using feedback and/or based on the capabilities of the devices and the topology. The reduced number of preamble repetitions may be indicated in the PHY header for the next frame in the burst transmission.

An example of the data and control transmission methods for different topologies is shown in Table 3. Typically, acknowledgements and command frames use the single transmission since they only transfer a limited amount of data. Even though acknowledgements may be desired for packed or burst transmissions, which may involve sequence numbers across multiple frames, they can still be sent in the payload of the single transmission.

TABLE 3

Data and Control Methods for Different VLC Topologies

| Topology | Frame Type | Data Transmission Mode |
|---|---|---|
| Peer to Peer, Star | Management, Acknowledgement | Single |
| Broadcast, Star | Beacon | Single |
| Peer to Peer | Data | Burst, Packed |
| Star | Data | Single, Packed |
| Broadcast | Data | Single, Packed |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a visible light communication (VLC) network, a method for communicating a plurality of medium access control (MAC) frames, each MAC frame associated with a configurable MAC frame structure, the method comprising:
providing a single configurable MAC frame structure to support a plurality of VLC topologies, the plurality of topologies comprising peer-to-peer, broadcast, star and visibility topologies; and
transmitting a plurality of frames comprising a plurality of frame types, the plurality of frame types comprising a color-visibility-dimming (CVD) frame and one or more of data, beacon, command, and acknowledgement frames.

2. The method as set forth in claim 1, further comprising: configuring an idle or receive slot in the CVD frame for visibility support, wherein visibility support is associated with transmission of a visibility pattern.

3. The method as set forth in claim 2, further comprising: transmitting the visibility pattern during the idle or receive slot to promote continuous visibility and mitigate flicker.

4. The method as set forth in claim 3, wherein the idle or receive slot is one of: a contention slot and an uplink slot.

5. The method as set forth in claim 1, further comprising: transmitting a visibility pattern concurrently with receiving a data communication in a full duplex mode for VLC in order to ensure continuous visibility.

6. The method as set forth in claim 5, wherein the visibility pattern is transmitted to promote color stabilization of a light source.

7. The method as set forth in claim 1, further comprising: determining a device type for a device from device capabilities information; and
based on a determination that a device is an infrastructure device, continually transmitting a visibility pattern during an idle or receive mode.

8. The method as set forth in claim 1, wherein the data frames are sent in at least one of the following modes: single mode, burst mode, and packed mode.

9. For use in a visible light communication (VLC) network, a transmitter configured to transmit a plurality of medium access control (MAC) frames, each MAC frame associated with a configurable MAC frame structure, the transmitter configured to:
provide a single configurable MAC frame structure to support a plurality of VLC topologies, the plurality of topologies comprising peer-to-peer, broadcast, star and visibility topologies; and
transmit a plurality of frames comprising a plurality of frame types, the plurality of frame types comprising a color-visibility-dimming (CVD) frame and one or more of data, beacon, command, and acknowledgement frames.

10. The transmitter as set forth in claim 9, the transmitter further configured to:
configure an idle or receive slot in the CVD frame for visibility support, wherein visibility support is associated with transmission of a visibility pattern.

11. The transmitter as set forth in claim 10, wherein the visibility pattern is transmitted during the idle or receive slot to promote continuous visibility and mitigate flicker.

12. The transmitter as set forth in claim 11, wherein the idle or receive slot is one of: a contention slot and an uplink slot.

13. The transmitter as set forth in claim 9, the transmitter further configured to:
transmit a visibility pattern and concurrently receive a data communication in a full duplex mode for VLC in order to ensure continuous visibility.

14. The transmitter as set forth in claim 13, wherein the visibility pattern is transmitted to promote color stabilization of a light source.

15. The transmitter as set forth in claim 9, the transmitter further configured to:
determine a device type for a device from device capabilities information; and
based on a determination that a device is an infrastructure device, continually transmit a visibility pattern during an idle or receive mode.

16. The transmitter as set forth in claim 9, wherein the data frames are sent in at least one of the following modes: single mode, burst mode, and packed mode.

17. For use in a visible light communication (VLC) network, a method for communicating a plurality of medium access control (MAC) frames, each MAC frame associated with a configurable MAC frame structure, the method comprising:
configuring each slot in a first MAC frame for a first data type;

transmitting the first MAC frame in a first VLC topology;
configuring each slot in a second MAC frame for a second data type; and
transmitting the second MAC frame in a second VLC topology;
wherein the first MAC frame is a color-visibility-dimming (CVD) frame and the second MAC frame a data, beacon, command, or acknowledgement frame.

18. The method as set forth in claim 17, further comprising:
configuring an idle or receive slot in the CVD frame for visibility support, wherein visibility support is associated with transmission of a visibility pattern.

19. The method as set forth in claim 18, wherein the visibility pattern is transmitted during the idle or receive slot to promote continuous visibility and mitigate flicker.

20. The method as set forth in claim 17, further comprising:
transmitting a visibility pattern concurrently with receiving a data communication in a full duplex mode for VLC in order to ensure continuous visibility.

* * * * *